United States Patent [19]
Forte et al.

[11] Patent Number: 5,192,598
[45] Date of Patent: Mar. 9, 1993

[54] FOAMED BUILDING BOARD COMPOSITE AND METHOD OF MAKING SAME

[75] Inventors: Don A. Forte, Evergreen; Jeffrey T. Kates; Dennis R. Larratt, both of Littleton, all of Colo.

[73] Assignee: Manville Corporation, Denver, Colo.

[21] Appl. No.: 760,797

[22] Filed: Sep. 16, 1991

[51] Int. Cl.⁵ .................................. B32B 3/26
[52] U.S. Cl. .................................. 428/71; 52/408; 156/78; 156/79; 428/74; 428/76; 428/119; 428/314.4; 428/316.6; 428/319.1
[58] Field of Search ............... 156/77, 78, 79; 52/408; 428/68, 71, 74, 76, 119, 120, 316.6, 319.1, 314.4, 314.8

[56] References Cited

U.S. PATENT DOCUMENTS

| | | | |
|---|---|---|---|
| 3,785,913 | 1/1974 | Hallamore | 428/119 |
| 4,119,750 | 10/1978 | Gorter | 428/71 |
| 4,324,834 | 4/1982 | Page et al. | 428/316.6 |
| 4,587,164 | 5/1986 | Freeman | 428/319.1 |
| 4,707,961 | 11/1987 | Nunley et al. | 52/408 |

Primary Examiner—William J. Van Balen
Attorney, Agent, or Firm—Cornelius P. Quinn

[57] ABSTRACT

A sheathing board capable of transmitting water vapor while retaining good thermal conductivity properties. The board is formed of a core comprising rigid foamed plastic interspersed with spaced areas of water vapor permeable insulating material that extend from one major face of the core to the other. The major faces of the core are preferably faced with a water vapor permeable sheet, allowing water vapor to travel through the spaced areas of insulating material and the facing sheets. By aligning the spaced areas of material with the insulation in a wall cavity, the strength of the board and its thermal conductivity are maintained within acceptable limits.

30 Claims, 2 Drawing Sheets

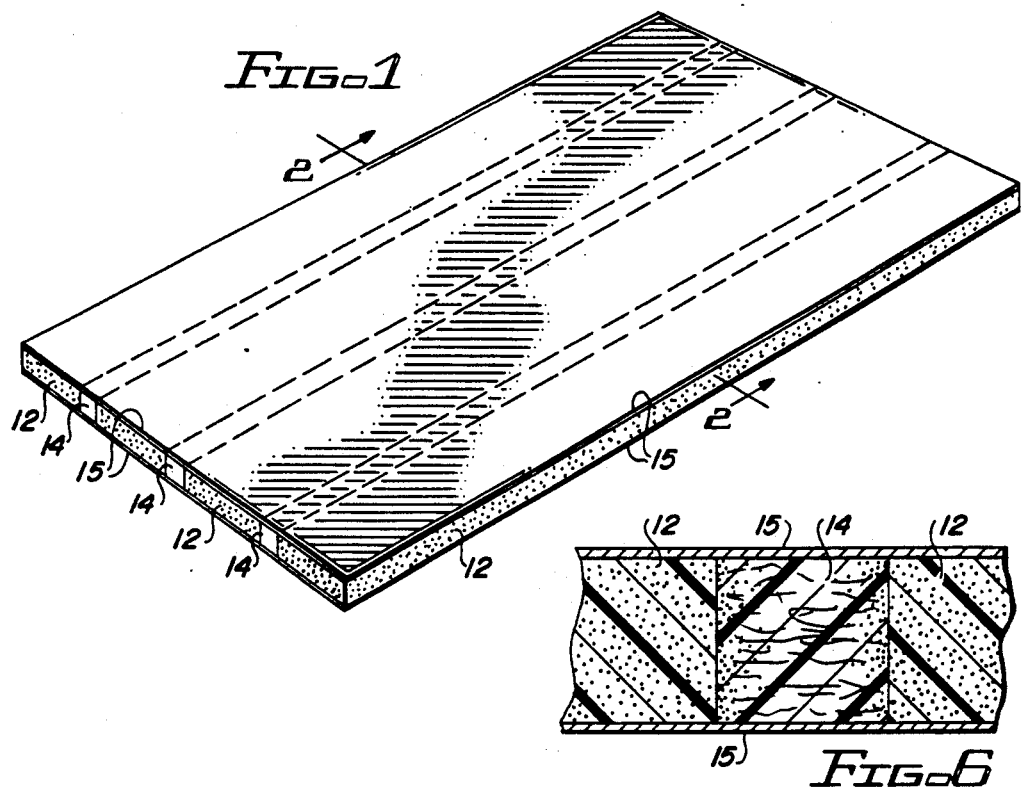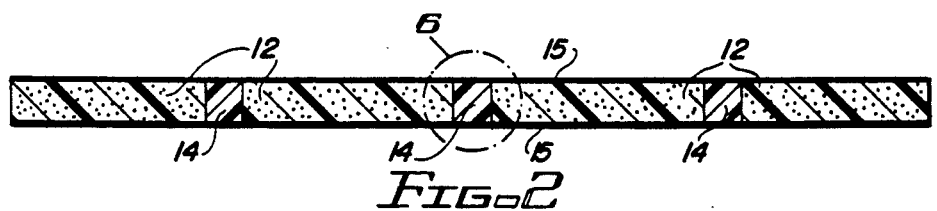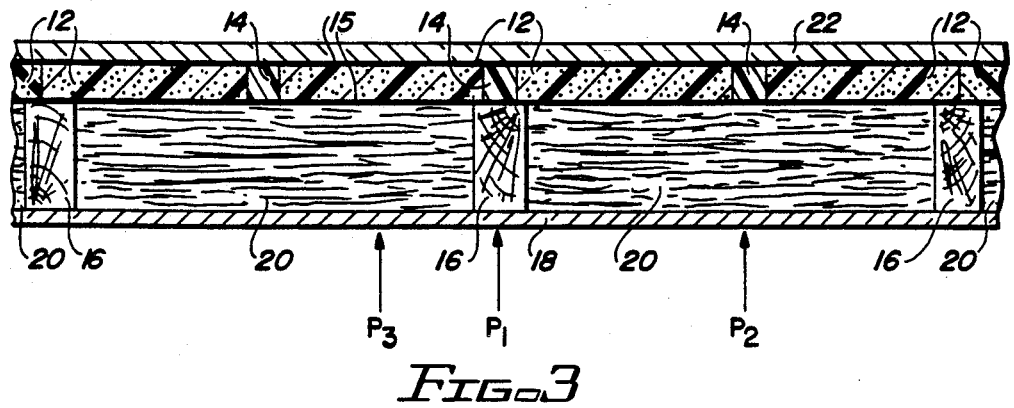

FOAMED BUILDING BOARD COMPOSITE AND METHOD OF MAKING SAME

FIELD OF THE INVENTION

This invention relates to a building board comprised of rigid foam. More particularly, it relates to a composite board designed to permit the transmission of water vapor even though the foam is essentially impermeable to water vapor. It further relates to a building wall construction incorporating the composite board.

BACKGROUND OF THE INVENTION

In the past, when energy costs were relatively low, the building materials normally utilized and the building procedures normally practiced were such that moisture vapor could readily escape building wall cavities through holes and permeable materials. As energy costs increased, more attention was paid to methods and means for insulating and waterproofing the building envelope, resulting in less air and moisture being transmitted through the building structure. Rigid foamed plastics were developed for use as sheathing boards which provide high thermal resistance. In virtually all cases, however, such materials are substantially impermeable to water vapor, typically having a water vapor transmission rating of 1 perm or less, which by industry standards is considered to be impermeable.

Sheathing boards of this type can be a problem in areas where the transmission of moisture would be beneficial. For example, depending on the temperature and relative humidity of the indoor and outside air, moisture in the form of condensation may develop in the wall cavity. In another common situation, wet lumber used to construct the building contributes to moisture in the wall cavity. In either case, the moisture needs an avenue of escape. If it cannot escape, it can decrease the effectiveness of the insulation in the cavity and contribute to mold and mildew and to the rotting of the building components.

Although it is desirable to have a wall structure capable of breathing or transmitting water vapor, it is also desirable for the purpose of energy conservation to continue to use sheathing boards that have low thermal conductivity. Because such foam material does not have high water vapor transmission properties, it would appear that its use in a building wall structure inherently prevents the wall structure from being permeable to water vapor.

It is an object of the invention to provide a rigid foam board that permits the passage of moisture without significantly diminishing the thermal insulating capacity of the wall structure. It is also an object of the invention to provide a simple, economical, efficient method of manufacturing such a board.

SUMMARY OF THE INVENTION

The composite building board of the invention comprises a first material which is relatively impermeable to water vapor, and spaced areas of a second material which is relatively permeable to water vapor. The second material extends from one major surface of the board to the other and effectively functions as windows through which water vapor is transmissible. Water vapor can thus move through the board by way of the windows of the second material. When the board is installed as a component in a building wall construction, the windows are located between the studs of the wall structure so as not to block the path of travel of water vapor.

The preferred impermeable material of the board is a rigid foam, with the best thermal performance being provided by closed cell foam. The permeable material within the core can be any of many materials, preferably one that also contributes to the thermal insulating value of the board, such as fiber glass insulation.

Preferably, the spaced window areas of the second material comprise substantially parallel strips of the second material extending from one major surface of the board to the other and from one edge of the board to the opposite edge. This arrangement functions well in a wall structure and allows the strips to be continuously added to the foam materials before the foam has set, with the set foam holding the strips in place in the board. Preferably, the board is manufactured through use of facing sheets, in which case the facing sheets must also be relatively permeable to water vapor.

The above and other aspects of the invention, as well as other benefits, will readily be apparent from the more detailed description of the preferred embodiments of the invention which follows.

BRIEF DESCRIPTION OF THE DRAWINGS

FIG. 1 is a pictorial view of a preferred embodiment of the composite foam sheathing board of the invention;

FIG. 2 is a transverse sectional view taken on line 2—2 of FIG. 1;

FIG. 3 is a transverse sectional view taken through a wall structure containing the composite sheathing board of FIG. 1;

FIG. 6 is an enlarged partial sectional view of the portion of the faced composite board within the circle 6 of FIG. 2, illustrating the adhesion of the foam to the fiber glass strips.

DETAILED DESCRIPTION OF THE PREFERRED EMBODIMENTS

Figure 4:
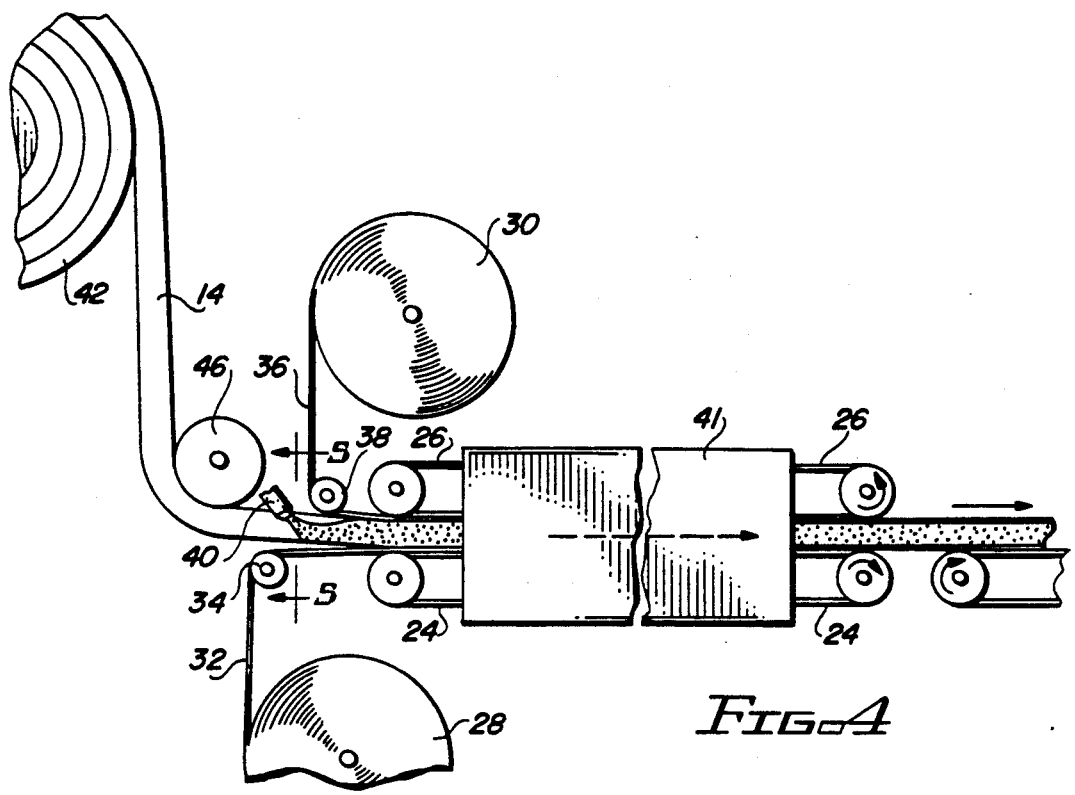
FIG. 4 is a schematic representation of a method for making the board.

Referring to FIGS. 1 and 2, the composite board 10 is of a size suitable for use in the building industry, typically measuring 4 feet by 8 feet, and is comprised in major part of material 12 which is substantially rigid and which also possesses good thermal insulation characteristics. Extending parallel to the length of the board are three spaced strips 14 of a different material which extend from one major face of the board to the other and from one end edge to the other. The end strips 14 of the second material are also spaced from the side edges of the board. Facing sheets 15 on each major face of the board cover both materials 12 and 14.

The material 12 preferably is comprised of rigid thermoset or thermoplastic foam material. Such material may comprise, for example, urethane, isocyanurate, polystyrene and phenolic foams, with the polystyrene foam being thermoplastic and the others being thermoset materials. Such materials normally have a very low water vapor transmission rating of 1 perm or less, which means that they are essentially impermeable to water vapor, and good resistance to heat flow, in the range of 4 to 8.5 R/inch. R values are determined by dividing the thickness (inches) of insulation by the thermal conductivity (BTU/inch per hour per square foot per °F).

The material employed for the strips 14 has a high water vapor transmission rating and preferably also contributes to the thermal insulating properties of the panel. Although the strips 14 are not limited to any one material, fibrous insulating material, and particularly fiber glass insulation, is preferred. A typical type of fiber glass insulation which functions well in the invention is a fiber glass board having a density in the range of 3 to 8 pounds per cubic foot (pcf). This material has a water vapor transmission rating of 75 perms and a thermal conductivity R value of 4 per inch of thickness.

The facing sheets 15 are also permeable to water vapor but are impermeable to air. Thus water vapor can be transmitted without introducing a draft, leading to a more comfortable environment. A preferred facing material is a spunbonded polyolefin produced under the trademark "Tyvek" by E. I. DuPont de Nemours Company, which allows the smaller water molecule to pass through but not the larger air molecule. The water vapor transmission rating for this facing material is approximately 75 perms. Another polyolefin sheet is available from PPG under the name "Teslin". A different type of sheet available from Simplex Products Corporation which is sold under the name "Barricade" includes micro perforations which permit passage of water vapor but not air.

The composite sheathing board is used in the same manner as a conventional sheathing board. As shown in FIG. 3, it is typically held in place in a wall structure by nailing it to the outer faces of spaced wooden studs 16. An interior panel 18, such as gypsum board, is nailed to the inner faces of the studs, and insulation such as fiber glass batts 20 fills the cavity between the boards. An exterior material 22, which may for example be wood siding, brick veneer, stucco, synthetic stucco, or the like, is also typically included in the wall structure of the building.

By adding permeable material to function as window areas through which water vapor can pass, material of relatively high thermal conductivity is replacing material of relatively low thermal conductivity. This has the unavoidable effect of lowering the insulating value of the wall system, which is contrary to the energy saving design of modern constructions. In the case of the sheathing board of the invention, however, the insulation value is lowered only modestly, due to the amount and location of the permeable material in the board as explained more fully below, while the water vapor transmission is increased to a degree that makes the board permeable. The slight reduction in insulating value is well worth the increase in water vapor transmission. This can be shown by comparing the effect of the sheathing board of the invention in these two areas in a typical building wall installation.

In the following comparisons typical dimensional relationships normally encountered in standard construction systems of the type shown in FIG. 3 are employed. In the wall cavity, the wood studs 16 account for about 20% of the wall area and the fiber glass batts 20 account for about 80% of the wall area. The sheathing board 10, which covers 100% of the wall area, is comprised of one inch thick phenolic foam 12 alternating with islands or windows of fiber glass insulation 14 having a density of 6 pounds per cubic foot, with the major surfaces of the board covered with facers. The foam comprises 85% of the board area, which in this case is the same as the wall area, and the fiber glass comprises 15% of the wall area. The facers comprise 100% of the board area. All of the fiber glass 14 overlies the insulation batts 20, while a portion of the foam overlies the insulation 20 and a portion overlies the studs 16. The portion of the foam covering or overlying the insulation batts 20 is 65% of the wall area, and the portion overlying the studs is 20% of the wall area. These components have the following ranges of water vapor transmission (WVT) ratings:

Wood stud: less than 5perms
Fiber glass batt: 75–100 perms
Phenolic foam sheathing: less than 1 perm
Fiber glass windows: 50–100 perms
Facing material: 30–100 perms Using typical WTV ratings of 1 perm for wood studs, 100 perms for fiber glass batts, 1 perm for phenolic foam sheathing, 75 perms for fiber glass windows and 75 perms for facing material, the water vapor transmission through the wall structure was determined based on the fact that water vapor transmission is a function of the wall component which is the least permeable to water vapor. Thus for the 20% of the wall area comprised of studs, the rating is less than 1 perm since both the studs and the phenolic foam sheathing have ratings of 1. For the 80% of the wall area comprised of the fiber glass batts, the composite moisture transmission rating is 15 perms, with most of the moisture passing through the 75 perm rated windows located between the studs. Since the overall water vapor transmission rating of the wall is the additive effect of the ratings of the different possible paths that water vapor can take through the wall, the rating is computed as follows:

$$\begin{aligned} WVT \text{ (wall)} &= 20\% \ WVT \text{ (studs)} + 65\% \ WVT \text{ (phenolic)} + \\ &\quad 15\% \ WVT \text{ (fiber glass windows)} \\ &= 20\% \ (1) + 65\% \ (1) + 15\% \ (75) \\ &= 0.2 + 0.65 + 11.25 \\ &= 12.1 \text{ perms} \end{aligned}$$

This compares with a rating of 16.2 perms for a wall construction utilizing standard wood fiber board having a 20 perm water vapor transmission rating and a rating of 1 perm for a wall construction utilizing standard phenolic foam sheathing. The improvement in water vapor permeability over a wall construction employing standard phenolic foam sheathing board is vast, while the decrease in permeability over a wall construction comprising wood fiber board sheathing is slight.

The wall construction should also be investigated to determine the effect that the new sheathing board has on insulating value. To do this it is necessary to keep in mind the amounts of wall areas covered by the various wall components as set forth above. Also, the R values of the components are necessary to the evaluation. Thus, the wood studs have an R value of 4.3, the fiber glass batts an R value of 13, the phenolic sheathing an R value of 8.33 per inch and the fiber glass windows an R value of 4 per inch. In addition, the gypsum board 18 has an R value of 0.45, based on a typical board having a thickness of half an inch. The facing material for all practical purposes has no thermal resistance and can be ignored.

The thermal value of the wall system is the proportional sum of the thermal resistances taken across each discrete set of components. The thermal resistance ($R_1$, $R_2$, $R_3$) of each of the paths $P_1$, $P_2$ and $P_3$ shown in FIG. 3 is the sum of the thermal resistances of the components encountered in the path. Thus:

$R_1 = 8.33 + 4.3 + 0.45 = 13.08$
$R_2 = 4 + 13 + 0.45 = 17.45$
$R_3 = 8.33 \; 13 + 0.45 = 21.78$

If the wall construction utilizes the standard type of phenolic foam sheathing board, the thermal resistance of the wall construction would be:

$$\begin{aligned} R &= 20\% \; (R_1) + 80\% \; (R_3) \\ &= 20\% \; (13.08) + 80\% \; (21.78) \\ &= 20.04 \end{aligned}$$

If the construction utilizes the sheathing board of the invention, the thermal resistance of the wall construction would be:

$$\begin{aligned} R &= 20\% \; (R_1) + 15\% \; (R_2) + 65\% \; (R_3) \\ &= 20\% \; (13.08) + 15\% \; (17.45) + 65\% \; (21.78) \\ &= 19.39 \end{aligned}$$

The figures show that the wall construction of the invention incorporating phenolic foam sheathing boards containing breathable windows of fiber glass has only slightly less thermal resistance than a wall construction incorporating standard phenolic foam sheathing boards.

Figure 5:
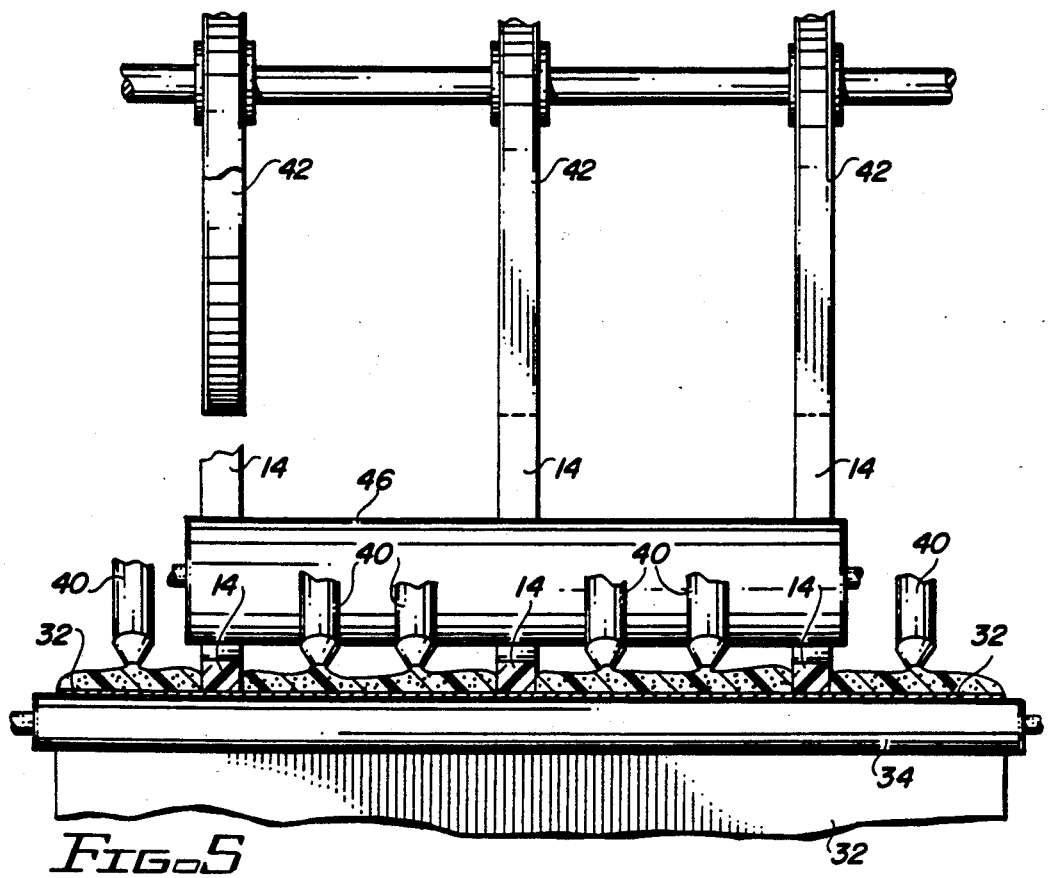
FIG. 5 is a transverse sectional view taken along line 5—5 of FIG. 4.

Most rigid thermoset foam boards include facing sheets on their major surfaces as a result of the process by which the boards are manufactured. Typically, liquid or semi-liquid chemicals are dispensed on a lower facing and then allowed to foam and rise to the upper facing in a compression conveyor. According to the invention, the material functioning as the water vapor permeable windows is deposited on the lower facing material so as to be immersed in the pre-foam liquid prior to the formation and setting of the foam. Preferably, it is introduced after the liquid or semi-liquid foaming chemicals have been deposited but while the foam is still in its liquid or semi-liquid state, allowing the hardening foam to hold the material in place. This is schematically illustrated in FIGS. 4 and 5, which show spaced lower and upper conveyor belts 24 and 26 and lower and upper rolls 28 and 30 of facing material. The lower web 32 of facing material is fed into alignment with the lower conveyor 24 about guide roll 34, while the upper web 36 of facing material is fed into alignment with the upper conveyor 26 about guide roll 38. The upper guide roll 38 is located downstream from the lower guide roll 34, allowing nozzles 40 to be positioned to deposit foaming chemicals onto the lower facing web 32. Gas burners, not shown, in the oven 41 through which the conveyors 24 and 26 travel, facilitate the foaming process.

Positioned at spaced locations across the width of the manufacturing line are rolls 42 of narrow webs 14 of insulating material. The narrow webs 14, which are introduced onto the lower facing web by guide rollers 46, are spaced apart a distance corresponding to a predetermined arrangement designed to position the insulating material in the final sheathing board product at locations which will be between the studs in a building wall. The narrow webs 14 are quickly bonded to adjacent foam as it sets, causing the webs to maintain their initial spacing, and the facing sheets are also bonded to the foam upon setting of the foam. As illustrated in FIG. 6, strips of fiber glass 14 resulting from introduction of narrow fiber glass webs are bonded at their sides to adjacent portions of the main foam body 12 of the finished product. Because the fiber glass strips are porous, the foam impregnates the fiber glass for a short distance at the edges of the strips before the foam sets, providing for a very secure bond that prevents any shifting of the strips with respect to each other. The impregnation of the foam takes place primarily at the side edges of the strips, leaving substantially all the fiber glass material as a path through which water vapor can travel.

Although the insertion of fiber glass strips in the foam board has been described as being carried out by introducing them in the form of continuous webs, the strips could also be introduced in discrete lengths by a suitable shuttle feed or other mechanism capable of successively introducing strips on a continuous basis.

While facings are preferred because they add structural integrity to the board and do not allow the passage of air through the board, they need not necessarily be used if the manufacturing process does not demand it, such as where the foaming chemicals are deposited directly onto the lower conveyor and the conveyor faces are coated with a non-stick material, or where the foam is made by a molding process. It will be understood that the bonding phenomenon illustrated in FIG. 6 applies to an unfaced board as well as to the faced board of FIG. 6.

It is possible to use permeable window material in the board other than in the form of spaced strips of fiber glass insulation as long as the permeablility of the material results in the composite board having adequate water vapor transmissibility. To meet this requirement the material should have a water vapor transmissibility rating of at least 30 perms, and the composite board would have a water vapor transmissibility rating in the range of 5 to 10 perms. In addition, the material should not increase the thermal conductivity of the board by an unacceptable amount, and so preferably should have an R rating of at least 2 per inch.

These parameters are also related to the total area of the window material in the sheathing. In general, the area of material must be large enough so that it has the desired impact on the permeability and thermal insulation characteristics of the overall wall structure, and it should be concentrated in those portions of the board which are installed between the studs in a conventional wood stud building wall construction. Further, the material should not be present in such great amounts that the strength of the board is adversely affected. The area of window material which conforms to the permeability and thermal insulating characteristics noted above should be in the broad range of 5% to 50% of the area of the sheathing board, and preferably should be in the range of 10% to 25% of the area.

The window material need not be limited to strips extending from one edge of the board to the other but may take any other form capable of being introduced into the foam in amounts that fall within the percentage range of board area referred to above and also capable of being positioned in the board so as to be located between the studs in a building wall.

In summary, the invention provides a novel composite sheathing board which is not only an effective thermal insulator but is also permeable to water vapor. The product can be manufactured by basic methods utilizing permanently adhered facing sheets, with the facing sheets themselves being suitably permeable to water vapor, and is designed to be installed in conventional wall structures so that the permeable material is located between studs where water vapor transmission is possible. The board is structurally sound and is economical to produce.

It should now be apparent that the invention is not necessarily limited to all the specific details described in connection with the preferred embodiments, but that changes to certain features of the preferred embodiments which do not alter the overall basic function and concept of the invention may be made without departing from the spirit and scope of the invention, as defined in the appended claims.

What is claimed is:

1. A composite building board, comprising:
   opposite major surfaces;
   the board being comprised of a first material which is relatively impermeable to water vapor;
   the board including spaced areas extending from one major surface to the other, each area being comprised of a second material which is relatively permeable to water vapor;
   whereby water vapor is transmissible through the second material of the board.

2. The composite building board of claim 1, wherein the first material is comprised of rigid foam.

3. The composite building board of claim 2, wherein the first material is comprised of a closed cell plastic foam.

4. The composite building board of claim 3, wherein the closed cell plastic foam is comprised of phenolic foam.

5. The composite building board of claim 3, wherein the closed cell plastic foam is comprised of isocyanurate foam.

6. The composite building board of claim 3, wherein the closed cell plastic foam is comprised of urethane foam.

7. The composite building board of claim 2, wherein the second material is comprised of inorganic fibrous thermal insulating material.

8. The composite building board of claim 7, wherein the inorganic fibrous thermal insulating material is comprised of fiber glass.

9. The composite building board of claim 2, including a facing sheet on each major surface of the board, the facing sheets being relatively permeable to water vapor and impermeable to air.

10. The composite building board of claim 9, wherein the spaced areas of the second material comprise substantially parallel strips of the second material extending from one edge of the board to the opposite edge.

11. The composite building board of claim 10, wherein the facing sheets are comprised of polyolefin.

12. The composite building board of claim 1, wherein the second material comprises 5% to 50% of the area of each major surface of the board and has a thermal insulating value of at least 2 R per inch and a water vapor transmission rating of at least 30 perms.

13. The composite building board of claim 12, wherein the second material comprises 10% to 25% of the area of each major surface of the board.

14. A building wall construction, comprising: exterior end faces and interior end faces;
   thermal insulation between the side faces of the studs;
   an interior wall panel attached to the interior end faces of the studs;
   an exterior sheathing panel attached to the exterior end faces of the studs;
   the sheathing panel having opposite major surfaces and being comprised of a first material which is relatively impermeable to water vapor and a plurality of spaced areas of a second material which is relatively permeable to water vapor, the areas of the second material extending from one major surface of the panel to the other, the sheathing panel surfaces between adjacent studs containing at least one area of the second material;
   whereby water vapor is transmissible through the areas of the second material of the sheathing panel.

15. The building wall construction of claim 14, wherein the areas of the second material in the sheathing panel account for 5% to 50% of the area of the building wall.

16. The building wall construction of claim 15, wherein the second material has a thermal insulating value of at least 2 R per inch and a water vapor transmission rating of at least 30 perms.

17. The building wall construction of claim 14, including a facing sheet on each major surface of the sheathing panel, the facing sheets being relatively permeable to water vapor and impermeable to air.

18. The building wall construction of claim 14, wherein the first material is comprised of rigid foam and the second material is comprised of fiber glass insulation.

19. The building wall construction of claim 18, wherein the rigid foam is comprised of phenolic foam.

20. A method of manufacturing a composite building board, comprising the steps of:
   depositing on a support surface liquid or semi-liquid chemicals designed to form a foam which is relatively impermeable to water vapor;
   depositing a second material which is relatively permeable to water vapor onto the support surface at spaced locations transversely of the support surface;
   causing the foam to expand to a predetermined thickness, the second material extending from the support surface throughout the thickness of the foam and being bonded to adjacent surfaces of the foam material; and
   removing the foamed material from the support surface.

21. The method of claim 20, including the step of providing a web of facing material between the foam-forming chemicals and the support surface and on the opposite surface of the foam, the facing material adhering to major surfaces of the foam and overlying the second material, the facing material also being relatively permeable to water vapor.

22. The method of claim 21, wherein the foam is a closed cell plastic foam and the second material is comprised of inorganic fibrous thermal insulating material.

23. The method of claim 22, wherein the closed cell plastic foam is phenolic foam and the inorganic fibrous insulating material is fiber glass.

24. The method of claim 22, wherein the closed cell plastic foam is comprised of isocyanurate foam and the inorganic fibrous insulating material is fiber glass.

25. The method of claim 22, wherein the closed cell plastic foam is comprised of urethane foam and the inorganic fibrous insulating material is fiber glass.

26. The method of claim 20, wherein the second material is introduced in the form of spaced substantially parallel strips.

27. The method of claim 20, wherein the second material comprises 5% to 50% of the area of each major surface of the resulting board.

28. The method of claim 27, wherein the second material has a thermal insulating value of at least 2 R per inch and a water vapor transmission rating of at least 30 perms.

29. The method of claim 28, wherein the facing sheets are comprised of polyolefin.

30. The method of claim 21, wherein the second material is deposited onto the support surface after the liquid or semi-liquid chemicals have been deposited.

* * * * *